UNITED STATES PATENT OFFICE.

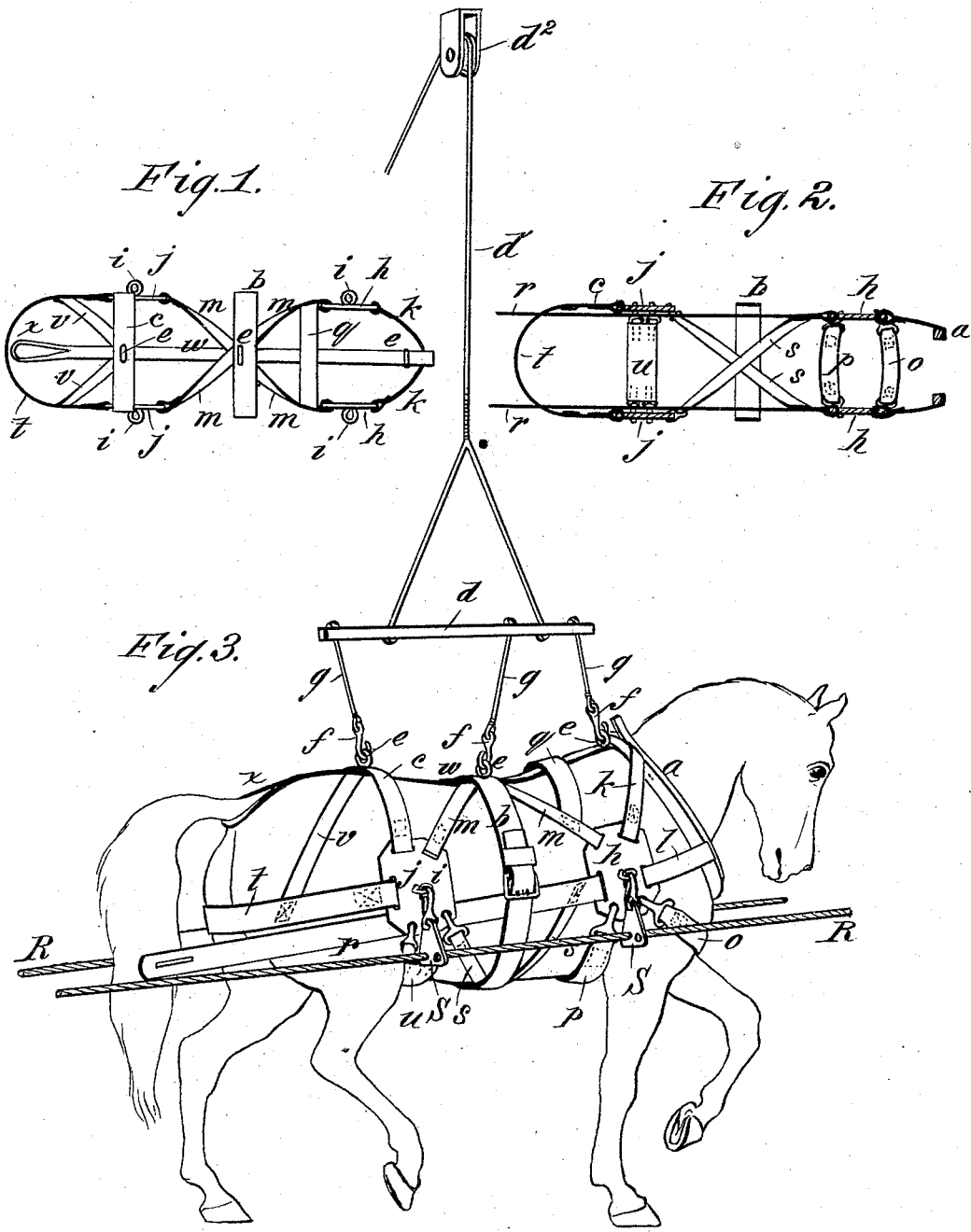

CHARLES F. SHEDD, OF FAIRFIELD, NEBRASKA.

HARNESS.

SPECIFICATION forming part of Letters Patent No. 319,327, dated June 2, 1885.

Application filed October 18, 1884. (No model.)

*To all whom it may concern:*

Be it known that I, CHARLES F. SHEDD, of Fairfield, in the county of Clay and State of Nebraska, have invented a new and Improved Harness, of which the following is a full, clear, and exact description.

This invention relates to a harness for breaking wild and vicious horses, and is designed more especially to be used in connection with the leading-ropes and sliding plates placed therein shown and described in my application for patent filed July 3, 1884, Serial No. 136,723.

My present invention consists, principally, of a harness having side pieces or plates for conveniently attaching the horse to sliding pieces placed upon leading or supporting ropes.

The invention also consists of the construction of the harness whereby it will keep its place upon the horse and sustain the weight of the horse no matter what position the horse assumes, or whether he kicks, plunges, or throws himself.

The invention further consists in the construction and arrangement of parts, as will be hereinafter described and claimed.

Reference is to be had to the accompanying drawings, forming part of this specification, in which similar letters of reference indicate corresponding parts in all the figures.

Figure 1 is a plan view of my new harness. Fig. 2 is a sectional plan view thereof. Fig. 3 shows the harness as it appears upon a horse and attached to the leading-rope, and it shows also the suspending-frame for the harness; and Fig. 4 is a detail view of a part of the belly-band of the harness.

The collar and hames $a$, back-strap $b$, and hip-strap $c$ of the harness are each provided with an eye, $e$, by which the harness may be attached to the bar $d$ by the hooks and small chains or cords $f$ $g$, as shown in Fig. 3. It is designed to suspend the bar $d$ over the stall in which the horse is to be harnessed, and for this purpose I employ the rope $d'$, attached to the bar $d$, and the pulley $d^2$, held above the stall, over which pulley the rope $d'$ passes, so that by drawing downward or letting away upon the cord $d'$ the harness may be lowered upon or raised off from the horse in the stall, thus avoiding the necessity of entering the stall and incurring the danger of putting the harness on and removing from the horse by hand. The harness has the side-plates $h$ $h$ and flank-plates $j$ $j$ formed in or attached to parts of the harness. In this instance the harness is composed, mainly, in front of the back pad or strap $b$, of the said collar and hames $a$, the straps $k$ $l$, that connect the plates $h$ with the collar and hames $a$, and the straps $m$, that cross over the back of the horse and connect the said side-plates $h$ with the flank-plates $j$, as shown clearly in Fig. 3. A breast-strap, $o$, and belly-strap P connect the plates $h$ $h$, and a back-strap, $q$, connects the straps $m$ $m$ near the plates $h$, as shown clearly in Fig. 3. The traces $r$ $r$ are attached to the side-plates $h$, and the traces are connected from a point near the plates $h$ with the plates $j$ by the straps $s$ $s$, that cross under the horse, as shown clearly in Fig. 2. The flank-plates $j$ are connected with each other by the above-mentioned hip-strap $c$, the breeching $t$, and the belly-strap $u$. The breeching is supported by the straps $v$ $v$, which reach from the breeching to the center of the hip-strap $c$, where they are secured to the said hip-strap $c$, and to the main back-strap $w$, that reaches from the collar and hames back, and has the crupper $x$ secured to it, as will be understood from Figs. 1 and 3.

The plates $h$ and $j$ may be of metal, leather, rubber, canvas, or any other suitable material, and they each are provided with an eye or staple, $i$, to which the sliding pieces S on the leading-ropes R may be attached by snaps or otherwise, as illustrated in Fig. 3, so that, the leading-ropes being held taut, as described in my above-mentioned application, the horse can be led along the ropes, which, together with the harness, will hold him from rearing and kicking, and will support him in case he should throw himself.

To prevent the horse from throwing his weight upon the rope R, I shall provide the belly-band P with one or more points, $t'$, that are adapted to reach up through the shield P', held to the belly-band by the ropes $v'$ $v'$, and upon the points $t'$, I place a coiled spring, $t^2$, that normally holds the shield P' above the point t'; but in case the horse should put his weight upon the belly-band the spring will yield, and the point will prick the horse and compel him to stand up.

Constructed as described, the harness will not only support the horse, but will remain in place upon the horse no matter what position he may assume.

Having thus described my invention, what I claim as new, and desire to secure by Letters Patent, is—

1. A harness formed or provided with plates at the side, to which sliding pieces or other means may be attached for attaching the horse to leading-ropes, as set forth.

2. The side-plates $h\ j$, provided with eyes $i$, and attached to the harness, substantially as and for the purposes set forth.

3. In a harness, the combination, with the plates $h\ j$, the collar, and hames, of the under and upper crossed straps, $m\ s$, connecting the said plates, and the straps $k\ l$, connecting the plates $h$ with the collar and hames, substantially as set forth.

4. The harness herein shown and described, consisting of the plates $h\ j$, collar and hames $a$, and the back, belly, hip, and breeching straps, arranged substantially as described.

5. In a harness of the character described, the belly-band P, provided with the point $t'$ and spring $t^2$, in combination with the shield P', arranged as and for the purposes set forth.

CHARLES F. SHEDD.

Witnesses:
JOS. BADGER,
F. X. STUPPY.